United States Patent [19]
Bhateja

[11] Patent Number: 4,855,925
[45] Date of Patent: Aug. 8, 1989

[54] MONITORING APPARATUS

[76] Inventor: Chander P. Bhateja, 23 Wildwood Rd., Keene, N.H. 03431

[21] Appl. No.: 38,229

[22] Filed: Apr. 14, 1987

[51] Int. Cl.$^4$ .............................................. G06F 15/46
[52] U.S. Cl. ........................ 364/474.06; 364/474.12; 364/474.15; 364/474.22; 364/474.28; 364/550; 340/680; 340/825.23
[58] Field of Search ................................ 364/167-171, 364/474, 475, 511, 550, 551, 474.06, 474.12, 474.15, 474.22, 474.28; 318/650; 340/825.23, 680, 679

[56] References Cited

U.S. PATENT DOCUMENTS

| | | | |
|---|---|---|---|
| 3,784,798 | 1/1974 | Beadle et al. ......................... | 364/475 |
| 4,504,920 | 3/1985 | Mickowski ...................... | 364/551 X |
| 4,536,849 | 8/1985 | Borisch et al. ................... | 364/475 X |
| 4,564,910 | 1/1986 | Smith et al. .......................... | 364/474 |
| 4,564,911 | 1/1986 | Smith et al. .......................... | 364/474 |
| 4,734,869 | 3/1988 | Mickowski .......................... | 364/550 |

Primary Examiner—Allen MacDonald
Attorney, Agent, or Firm—McCormick, Paulding & Huber

[57] ABSTRACT

Apparatus for monitoring a grinding machine to produce a simultaneous plot of relative displacement between a grinding wheel and a workpiece and the power consumed during the relative displacement receives signals from a linear displacement transducer and a power transducer associated with the grinding machine. The transducers are sampled in a time multiplex manner and data representative of and corresponding to the signals are selectively stored on a suitable storage medium for retrieval by and use in a central processing unit (CPU) to produce a plot of a grinding cycle. Computational modules are the stored data in determining a variety of grinding parameters.

7 Claims, 3 Drawing Sheets

MONITORING APPARATUS

BACKGROUND OF THE INVENTION

The present invention relates generally to monitoring and the simulateous plotting of output signals produced by transducers associated with the measurement of related operational parameters. The invention deals more specifically with machine monitoring apparatus for processing and generating in substantially real-time, simultaneous plots representative of machine member motion relative to a workpiece and the power consumed to produce the motion. The invention further specifically deals with monitoring apparatus for the selective collection, storage and subsequent retrieval of plot data, plots collectively representative of plot data and the calculation of desired machine and process parameters using the plot data.

It is known presently to monitor the operation of a machine, such as, for example, a grinding machine or other material removal/processing machine, by recording the relative movement between a machine member and a workpiece and the power consumed by the machine during the machine process. Such recordings are generally plotted on continuous rolls of recording paper using a strip chart recorder coupled to one or more transducers associated with the machine being monitored. Typically, for a grinding machine, a linear displacement transducer senses the movement of a grinding wheel relative to and generally toward and away from a work piece and generates an output voltage signal having a magnitude representative of and proportional to this relative displacement between the grinding wheel and the workpiece during a grinding cycle. A power transducer senses the power consumed in the material processing during the grinding cycle and generates an output voltage signal having a magnitude representative of and proportional to the power consumption. The voltage signals representative of displacement and power consumption are sensed and recorded by the strip chart recorder. Data corresponding to the relative displacement and power consumption is manually extracted using scales, calipers, dividers, etc. from a plot on a off-line basis, assuming such a plot was made and recorded, for the desired machine operation. The extracted data is subsequently used in accordance with known mathematical formulas to calculate the desired parameters from which the performance of the machine and the efficiency of the machine process may be determined and evaluated.

Although a conventional strip chart recorder has the capability of recording information from a number of different transducers monitoring a machine process, there are a number of limitations and disadvantages associated with its use that makes strip chart recording extremely cumbersome and generally unsatisfactory for monitoring grinding machines and the like in a typical manufacturing facility.

One problem generally associated with machine monitoring using strip chart recorders is that the monitored information is recorded and stored on relatively long strips or continuous rolls of chart paper. As a result, it is often inconvenient, difficult and tedious to review the recorded information to extract the necessary desired data for use in the computational formulas.

Another problem generally associated with monitoring using strip chart recorders is that although it is possible to sense and record transducer output signals in real-time, associated computations, analysis, etc. must generally be done after-the-fact and off-line. Accordingly, any problems that may be present and associated with the machine or machine process and which problems may affect the final product produced by the machine process may go undetected for some period of time. The delay associated in detecting such problems often results in increased costs, lower machine and process efficiency, increased machine maintenance and products having an inferior quality.

Another problem generally associated with monitoring using strip chart recorders is the difficulty and inconvenience associated with changing and tracking the calibration scales or gain of the recorder during the monitoring and recording interval. Generally, a voltage signal having a known magnitude is used to calibrate the excursion of the recording pen across the chart paper, that is, a given magnitude voltage causes the recording pen to move an associated given distance. If the gain of the strip chart recorder is changed, for example, to increase the pen excursion for a small magnitude signal or to reduce the pen excursion to stay within the limits of the recording paper for a larger magnitude signal, it is generally necessary to stop the monitoring and recording process to permit the recalibration. In addition, the point at which the recalibration or scale change is made must be recorded on the chart paper. If the scan time interval is changed to expand or compress a plot, that is, if the rate at which the chart paper is fed is increased or decreased, each new associated scan rate must also be recorded on the chart paper for off-line use in data extraction. Consequently, it is generally not possible or practical using strip chart recorders to produce data plots that are customized for a user's specific application needs. A careful and involved review of the raw-data recorded followed by complete replotting are generally necessary to obtain presentable and meaningful data when using a strip chart recorder.

A further problem generally associated with monitoring using strip chart recorders is that if a signal associated with a transducer output is not recorded on the chart paper at the time it occurs, it can not be regenerated or recaptured because the data is lost. Often during the analysis of recorded plots, it is found that data from one or more previous machine operation cycles would be useful but is not available because the output signal information was not plotted and from which plot the desired data could be extracted for analysis. Consequently, all output signal information must be sensed and recorded by the strip chart recorder at the time of machine operation to insure that all data will be available for later use if so desired.

It is desirable therefore to provide apparatus for monitoring in real-time the operation of a machine or other process that overcomes the disadvantages and the limitations generally associated with monitoring using strip chart recorders.

It is a general object of the present invention therefore to provide monitoring apparatus that overcomes the drawbacks and limitations associated with monitoring using strip chart recorders.

It is a more specific object of the present invention to provide a monitoring apparatus that is particularly suited for monitoring in real-time the output signals from a plurality of transducers which transducers sense related process or operational variables.

It is another specific object of the present invention to provide monitoring apparatus for monitoring and recording in real-time data associated with and representative of the relative displacement between a grinding wheel and a workpiece and the power consumption of a grinding machine during a grinding cycle.

It is a further object of the present invention to provide monitoring apparatus that is both portable and easily adaptable for use in monitoring a variety of grinding machines.

It is yet a further object of the present invention to provide monitoring apparatus that continuously collects data associated with the grinding machine operation for use in generating a plot of relative displacement and power consumption wherein the data is, if desired, subsequently stored electronically in digital form for processing.

It is yet a further object of the present invention to provide monitoring apparatus that recalls the stored data associated with a selected monitoring cycle and processed as a graphic representation for selective viewing on a display or on a paper print out.

It is still yet a further object of the present invention to provide monitoring apparatus for computing various grinding parameters from data electronically stored in the apparatus and related to a given grinding machine.

It is still a further object of the present invention to provide monitoring apparatus that permits the easy changing and automatic continuous tracking and identification of calibration and time scales.

Other objects, features and advantages of the present invention will be readily apparent from the following detailed description and the claims taken in conjunction with the accompanying drawings.

SUMMARY OF THE INVENTION

In accordance with the present invention, apparatus for monitoring in real-time the output signals from a plurality of transducers which transducers sense related process or machine variables is presented. The apparatus is coupled to and receives output voltage signals from a plurality of transducers connected to a machine being monitored and typically the transducers include a linear displacement transducer for sensing the relative movement between a machine member such as a grinding wheel and a workpiece and a power transducer for sensing the power consumed the material processing operation. A signal conditioning circuit receives an output voltage signal from its associated transducer in response to the relative movement between the grinding wheel and the workpiece.

A number of different operating modes are contained in an instruction set and are selectable in response to an input command. A signal processing means is responsive to the instruction set and samples in real-time the signals produced by the transducers and stores data corresponding to the signals in a storage device. Data is retrieved from the storage device and transformed for viewing as a simultaneous plot of a relative displacement between the grinding wheel and the workpiece and the power consumed during the grinding.

The invention further concerns means for computing from the data collected different machine and process parameters related to the machine and process being monitored.

DESCRIPTION OF THE PREFERRED EMBODIMENTS

The monitoring apparatus embodying the present invention may be used to monitor in real-time the output signals from a plurality of transducers which sense related process, machine or other operational variables associated with a machine, manufacturing process, system operation and the like. Such transducers may sense for example, displacement, power, force, pressure, temperature, vibration, etc. wherein the movement of a machine member relative to a workpiece and the power consumed in moving the machine member is monitored and recorded. By way of example and for illustrative purposes, the monitoring apparatus embodying the present invention is disclosed specifically for monitoring a grinding cycle in a grinding machine.

A grinding cycle as used in the present disclosure is defined as one engagement and disengagement of a grinding wheel associated with a grinding machine with a workpiece being ground. The complete grinding operation of a single part may require one or more grinding cycles wherein each cycle generally removes an increment of workpiece material. The relative wheel-workpiece motion in a cycle may comprise a longitudinal motion parallel with a flat workpiece surface or it may consist of a rapid grinding wheel approach, one or more grinding feed rates, spark-out and a rapid grinding wheel retraction. The terms defining a grinding cycle are generally well understood by those skilled in the art.

It is also generally well understood in the art that forces, generally referred to as grinding forces, are produced during a grinding operation due to the contact between the grinding wheel and the workpiece. The magnitude of a grinding force generally varies during a given grinding operation and is directly related to the power consumption of the grinding wheel drive motor. It is also generally known that the material removal rate from a workpiece surface is related directly with the rate at which the grinding wheel moves into the workpiece and is representative of the amount of material removed in the grinding process. A number of grinding process parameters which include for example, the in-feed rate wherein the grinding wheel feeds into the workpiece, the volumetric material removal rate per unit time, grinding power per unit of workpiece, width tangential grinding force, normal grinding force, the specific power consumption per unit volume of work material removed and equivalent grinding chip thickness or Heq which are considered to be of some universal significance in grinding, are calculated utilizing power consumption and the relative displacement between a griding wheel and a workpiece. The comparison of such fundamental process parameter for different operating can provide valuable and meaningful evaluation of the basic material removal ability of a grinding wheel and other grinding machine variables.

Figure 1:
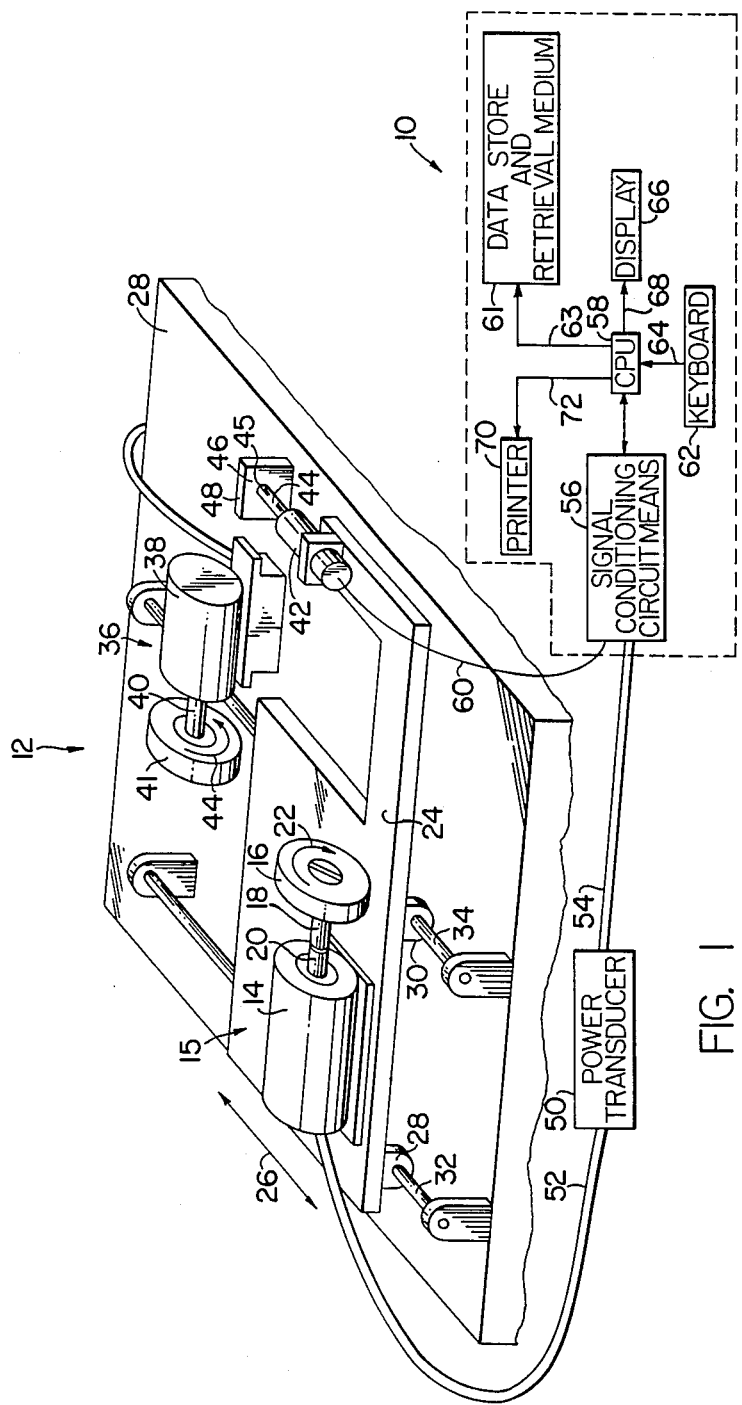
FIG. 1 is a diagrammatic functional block diagram of the basic system components of the machine monitoring apparatus comprising the present invention shown connected to a representative grinding machine having a wheelhead and workpiece arranged for relative movement with respect to one another.

Turning now to the drawings and considering FIG. 1 in particular, the machine monitoring apparatus embodying the present invention is shown in block diagram form and generally designated 10. The monitoring apparatus 10 is coupled to a representative grinding machine shown generally at 12. The grinding machine 12 includes a grinding wheelhead motor 14 for rotating an abrasive wheel 16 mounted on a spindle 18 which spindle is attached to the shaft 20 of the motor 14. The motor 14, spindle 18 and grinding wheel 16 comprise a grinding assembly 15. The grinding assembly 15 is mounted on a slideable support 24 which is arranged for rectilinear movement to move the grinding assembly in a direction indicated by arrow 26. The support 24 includes bearing blocks 28, 30 mounted to the lower surface of the support and which ride upon guide rails 32, 34 respectively.

A workpiece holding assembly designated generally 36 includes a motor 38 connected to a spindle 40 for holding a work-piece 41 for rotation in a direction 44. The workpiece holding assembly 36 is located so the workpiece 41 and the grinding wheel 16 are in intersecting alignment permitting the grinding wheel to move into and out of contact with the surface of the workpiece.

A linear displacement transducer 42 is connected to and arranged for movement with the slideable support 24. The linear displacement transducer 42 is generally well known to those skilled in the art and produces an output voltage signal which is proportional to the axial movement of a plunger 44 into and out of the transducer body. As illustrated in FIG. 1, the free end 45 of the plunger 44 is arranged to come into contact with the surface 46 of a stop 48. The plane of the surface 46 is stationary relative to the surface of the ground workpiece in holding assembly 12 and is also substantially perpendicular to the direction of movement of the grinding wheel 16.

The linear displacement transducer 41 generates an output signal on lead 60 which is representative of the linear displacement of the slideable support 24 toward and away from the workpiece holding assembly 36 and which signal is coupled to the signal conditioning circuit means 56.

Still considering FIG. 1, a power transducer 50 is coupled to the grinding wheel drive motor 14 by a cable 52 to sense the voltage and current supplied to the drive motor. The power transducer 50 generates an output voltage signal on lead 54 which signal is representative of and proportional to the power consumed by the drive motor. The power transducer 50 is generally well understood to those skilled in the art and typically performs the voltage-current multiplication function to produce an output signal corresponding to the actual power consumption in watts.

The output voltage signal on lead 54 is coupled to the signal conditioning circuit means 56 which circuit 56 interfaces the power transducer 50 and the linear displacement transducer 42 to a central processing unit (CPU) 58 of the monitoring apparatus 10.

The monitoring apparatus 10 also includes a keyboard 62 coupled to the CPU 58 by a lead 64. The keyboard 62 is used to input commands and other information into the CPU 58 for use by the CPU in performing its various functions as explained in further detail below. A display 66 is coupled to the CPU 58 via lead 68 and is used to provide a visual graphical (or plotted) presentation of the power consumption of the grinding wheel drive motor 14 and the relative displacement between the grinding wheel 16 and workpiece 41 as sensed by the transducers 50 and 42, respectively. A printer 70 is also coupled to the CPU 58 via lead 72 and is used to provide a hard copy output of information generated by the CPU. A storage and retrieval medium 61 with full read and write capability is also connected to the CPU 58, via read 63, to allow storing and recall of the user application data.

Figure 2:
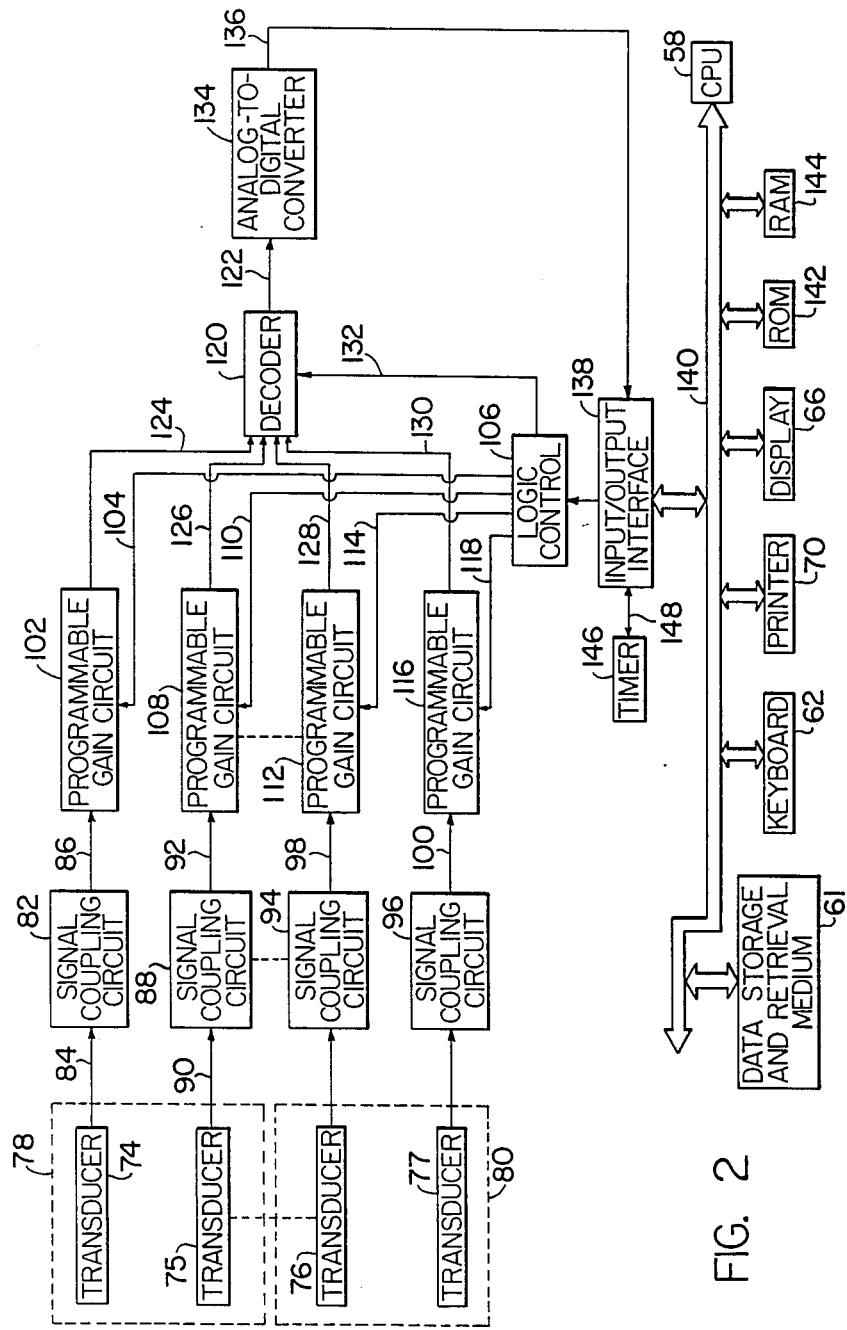
FIG. 2 is a more detailed functional block diagram of the monitoring apparatus of the invention shown in FIG. 1.

Turning now to FIG. 2, a more detailed functional block diagram of the monitoring apparatus as embodied in the present invention is shown wherein the apparatus is arranged to monitor a number of transducers 74, 75, 76 and 77. Depending upon the application, the individual transducers may sense power consumption, forces, displacements, temperatures or other process variables of interest to provide appropriate output signals for use in this monitoring apparatus. In addition, as necessary these various transducers individually or in groups may be associated with a separate grinding machine 78, 80, respectively. The output signal from the power transducer 74 associated with the grinding machine 78 is fed to a signal coupling circuit 82 via lead 84 and which circuit 82 transforms the transducer output signal into a form useable by the monitoring apparatus. Typically, the signal coupling circuit 82 inlcudes means for calibrating the gain of the transducer so that a reference voltage signal having a predetermined magnitude and corresponding to the maximum output voltage generated by the power transducer 74 is produced by coupling circuit. The output signal of the signal coupling circuit 82 produced on lead 86 is generally a DC voltage which has a magnitude representative of and proportional to the power measured by the power transducer.

The linear displacement transducer 75 is coupled to a signal coupling circuit 88 via a lead 90. The signal coupling circuit 88 transforms the output voltage signal of the transducer 75 and includes means for calibrating the gain of the transducer so that a reference voltage signal having a predetermined magnitude is produced at the output 92. The magnitude of the reference voltage is representative of and corresponds to the maximum displacement that is sensed by the linear displacement transducer 75.

The signal coupling circuit 94 is substantially identical to the signal coupling circuit 82 and the signal coupling circuit 96 is substantially identical to the signal coupling circuit 88 with the exception that each of the circuits 94 and 96 interface transducers associated with a different grinding machine 80. For purposes of understanding the present disclosure, it is only necessary to know that the signal coupling circuit 94 produces an output signal on lead 98 and the signal coupling circuit 96 produces an output signal on the lead 100 and that the signals are similar to the signals on leads 86 and 92 respectively.

The sensitivity of the monitoring apparatus coupled to the transducer 74 may be increased or decreased by a programmable gain circuit 102 wherein the gain sensitivity is selectable by a command signal present on the lead 104 and produced by the logic control circuit 106 in response to a user selected gain inputted on the keyboard 62. In a preferred embodiment of the monitoring apparatus, the gain sensitivities are provided 0.5, 1, 2, 3 and 4.

The gain sensitivity for each of the signals generated by the remaining transducers 75, 76, 77 being monitored may be changed in a similar manner. A programmable gain circuit 108 is coupled to the output 92 associated with the linear displacement transducer 75 in the grinding machine 78. The programmable gain circuit 108 operates in a similar manner as the programmable gain circuit 102 and is controlled by a command signal on lead 110 generated by the logic control circuit 106 under control of the CPU 58. Additional progammable gain circuits are provided and associated with each of the additional transducers being monitored by the apparatus. A programmable gain circuit 112 is associated with the power transducer 76 in the grinding machine 80 and its gain is controlled via a command signal on lead 114. A programmable gain circuit 116 is associated with the linear displacement transducer 77 in the grinding machine 80 and its gain is controlled by the command signal on lead 118.

The various transducers 74, 75, 76, 77 associated with the grinding machines 78 and 80, respectively are monitored and sensed in a time multiplex sampling fashion wherein a decoder 120 connects one input 124, 126, 128, 130 at a time to its output 122. Each of the inputs of 124, 126, 128 and 130 of the decoder 120 is associated with an output signal from its corresponding programmable gain circuit 102, 108, 112 and 116, respectively. In the illustrated diagram of FIG. 2, the decoder 120 is a one-of-four decoder and each input is selectable by a decoding signal present on the lead 132.

Each output signal from a corresponding programmable gain circuit 102, 108, 112, 116 is converted by an analog-to-digital convertor 134 to a digitally encoded word at its output 136 and which encoded word corresponds to the magnitude of the signal present at its input 122.

The digital signal present on lead 136 is coupled to an input/output interface circuit 138 for transmission on a data communication bus 140 in a manner well understood by those skilled in the art.

An instruction set for controlling the operation of the CPU 58 is included in a read-only-memory device (ROM) 142 and communicates with the information bus 140. A temporary memory device in the form of a random memory (RAM) 144 may be used to temporarily store the monitored information received on the information bus 140 and which information may be retrieved from the RAM in a manner well known to those skilled in the art. It is understood that the functions provided by the CPU 58, ROM 142 and RAM 144 may be performed by any of the processing and memory devices well known to those skilled in the art. For purposes of this disclosure, the basic software necessary for driving, interfacing and communications between the various hardware components including the CPU, keyboard, printer, display and the data storage medium is contained in the ROM 142 which ROM is addressed in the normal manner. The special instruction set used to control the monitoring operation of the apparatus may also be contained in the ROM 142 or it may be contained in the data store/retrieval medium 61. In the preferred embodiment for the grinding machine application. Such monitoring instruction set is resident in the store/retrieval medium 61.

During monitoring, the transducers 74, 75, 76, 77 associated with the grinding machine are continuously scanned and the output signals corresponding to the information sensed by the transducers are sequentially sampled and their magnitude is stored in the RAM 144 in digital form. The data is stored in the RAM 144 for subsequent retrieval and use by the CPU 58 in the computational formulas and also for generating the various visual displays or screens corresponding to plots of the power consumption and the relative displacement of the grinding wheel with repsect to the workpiece.

The display of a given screen of information is accessed by a user via the keyboard 62 and the plot may be displayed on the display 66 or printed as hard copy by the printer 70. Since the transducers are continuously scanned and all the information associated with each scan cycle is stored in the RAM for subsequent retrieval, a user is able to review the data stored and displayed as plots of power consumption and relative displacement prior to deciding whether or not to save the information in a permanent storage medium, 61.

The monitoring apparatus also includes a timer 146 which provides timing pulses at a predetermined frequency and which pulses are used to control the data sampling rate of the
apparatus. The pulses are coupled to circuitry in the input/output interface 138 via lead 148 and which pulses are used to set the duration of a scan to a desired time value. In the preferred embodiment, the scan duration is selectable via input from the keyboard 62 and ranges from 10 to 1200 seconds. That is, the duration of a plot of a grinding cycle can be expanded or compressed as desired. This is essentially equivalent to speeding up or slowing down the paper feed rate in a chart recorder.

A feature of the monitoring apparatus of the present invention is that a number of different machines may simultaneously be monitored and the performance of each machine may be compared in real-time. This feature allows a user to ensure that the workpieces produced by one machine are consistent with workpieces produced by a different machine. Furthermore since the data may be stored indefinitely and retrieved instantly, a comparison of the machine operation may be made over a period of time to ensure that a workpiece produced at any given time is consistent with a workpiece produced at any other time.

Figure 3:
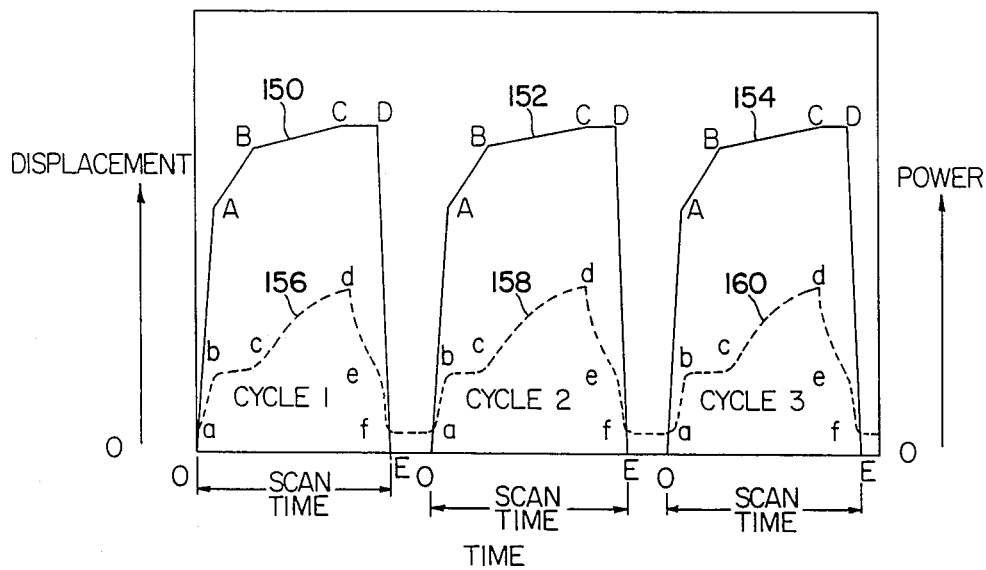
FIG. 3 shows a representative graph generated by the monitoring apparatus of the present invention illustrating a simultaneous plot for the relative displacement between a wheelhead and a workpiece and the power consumed in moving the wheelhead during a typical grinding cycle.

Turning now to FIG. 3, a typical grinding cycle plot generated by the monitoring apparatus of the present invention is illustrated for three grinding cycles. The relative movement or displacement between the grinding wheel and a workpiece is indicated by the plots 150, 152, 154 and each is representative of the relative displacement over time between the grinding wheel and the workpiece. The displacement scale is indicated on the left vertical axis of the graph and may be in either english or metric units. The scale generally corresponds to the maximum displacement measured by the linear displacement transducer.

The plots 156, 158 and 160 correspond to the power consumption of the grinding wheel motor during the associated respective grinding cycle. The grinding power units are expressed as watts and are graduated on the right vertical axis of the graph. The grinding cycle illustrated by the plot 150 comprises a portion 0-A and represents the rapid approach of the grinding wheel toward the workpiece. The rapid approach is also known by the term "air time". The portion of the curve 150 extending from A-B represents the rough grind portion of the grinding cycle or the coarse grinding feed. The portion of the plot 150 from B-C represents the fine grinding or the finish grind of the grinding cycle. The portion of the curve between C-D is generally known as the spark-out portion of the cycle. That is, any grinding of the workpiece by the grinding wheel during the spark-out interval is due to the tension of the spindle holding the grinding wheel against the workpiece causing the grinding wheel to exert additional pressure on the workpiece. The portion of the plot 150 from C-D represents the retraction of the grinding wheel away from the workpiece. As can be seen, the velocity of the grinding wheel toward and away from the workpiece is the derivative of the motion curve 150.

The corresponding power consumption during the grinding cycle represented by the plot 150 is illustrated by the plot of the power curve 156. The portion of the power curve a-b represents an increase in power from idle power as the grinding wheel moves toward but before contacting the workpiece. The portion b-c represents the coolant drag power, that is, the extra power required by the wheel motor to spin amount in the coolant or grinding fluid tight space between the grinding wheel and the workpiece surface. As the grinding wheel moves further towards the workpiece during the rough grinding portion of the cycle, actual work material removal starts consuming more power. The portion of the power curve 156 from c-d represents the changes in the grinding power pattern during the actual grinding period. The portion of the power curve 156 from d-e represents the power during the spark-out interval. The portion of the power curve 156 from e-f is the power consumed as the grinding wheel is retracted to the idle position.

The composition of he grinding cycles presented here is for illustration only. The actual cycles selected in a grinding application generally vary a great deal and are determined by the geometry and size of the workpiece being ground, the cutting ability of the grinding wheel, the grinding machine characteristics and constraints as well as the required quality of the ground components. Generally, the industrial practice lacks in the use of scientific methodology in determining the best possible grinding cycle for a given workpiece. Experience and empirical approaches are commonly employed to provide generally adequate and acceptable but non-optimum grinding cycles. The easy to learn but powerful real-time monitoring capability of this invention coupled with its data handling and presentation ability as well as its ability to compute instantly important grinding process parameters therefore makes this monitoring apparatus in its preferred embodiment, an important tool for the grinding industry.

Figure 4:
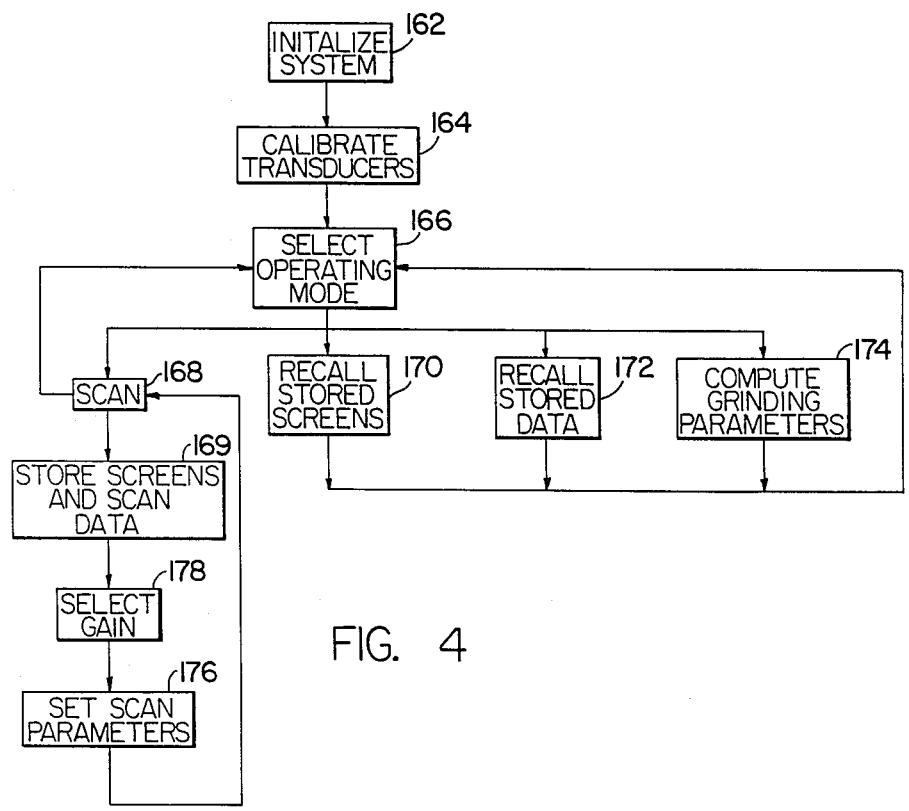
FIG. 4 is a flow chart of the instruction set used to control the operation of the monitoring apparatus of the present invention.

Turning now to FIG. 4, a flow chart of the basic instruction set used to control the operation of the monitoring apparatus of the present invention is shown. Upon first applying power to the apparatus, a prompt is presented on the display and requests that the system be initialized. The initialization procedure is represented by the instruction initialize system command 162. During initialization, the time and date are entered into the system.

Upon completion of the initialization procedure, the display presents a prompt command which requests that the transducers be calibrated and which command is represented at 164. The prompt for the transducer calibration provides a user a choice of units in either the english or metric system. During the calibration of the linear displacement transducer, the maximum expected travel range is entered via the keyboard and a gain adjustment is carried out via a gain adjust knob on the apparatus so that the displacement units on a grinding cycle plot, such as shown in FIG. 3, correspond to a desired full scale deflection on the display screen. For example, in the preferred embodiment if the maximum expected displacement of the transducer during monitoring is initially set at one inch, then the full scale plot of the relative displacement of the grinding wheel with respect to the workpiece is indicated as two inches. The calibration of the power transducer may be carried out using a similar procedure.

After the transducers are calibrated, the user selects via keyboard entry one of the operating modes of the monitoring apparatus as represented by the command block 166. Typical operating modes include scanning, represented by the command block scan 168 which also allows storage of plot screens and data represented by block 169, recall stored screens represented by the block 170, recall stored data represented by the block 172 and compute grinding parameters represented by the command block 174.

When the operating mode scan is selected, a prompt requesting the setting of scan parameters represented by the command function block 176 is displayed. Parameters such as the type of grinding machine, assigned part number, operator, grinding wheel specification and work material are entered via the keyboard during the set scan interval. Once the scan parameters are set, a prompt represented by the select gain command box 178 is displayed and requests that the desired transducer gain be entered. After the desired gain is selected, the instruction set reverts to the scan operating mode and awaits either a keyboard entry or a signal from a switch mounted on the grinding machine before it starts collecting data from the transducers in real time as explained above. The real-time plot of the grinding cycle produced is similar to the graphical representation illustrated in FIG. 3. The user may select either a single grinding cycle scan or continuous monitoring as desired.

The data collected during the scan mode may be stored for an unlimited time on the storage medium 61 by command block 169 for subsequent retrieval during the recall modes 170 and 172. It is important feature of the present invention to permit the user to make the decision to store if the scan data proves to be of interest after the data has been scanned. the preferred embodiment of the present invention allows scan interrupt at will followed by data storage if so desired. Two distinct storage modes are permitted, namely as the final displayed scan screen and complete data of the present run. The scanning function is terminated at any time upon the entry of a termination code at the keyboard. The instruction set will then permit return to the select operating mode command box 166.

The scan data on the storage medium 61, stored at will by the user in command block 169 as a single screen or as a continuous scan data may be recalled instantly for review and further processing in the two recall options in command blocks 170 and 172. The recalled data is set up, and identification information and any special comments entered by the user while storing the data.

When the compute grinding parameters operating mode is selected as represented by the command function box 174, a prompt on the display requests selection of the desired computation module. Each computation module uses either standard or custom formulas to calculate the various grinding parameters. A computation module may contain, for example, appropriate formulas for computing grinding parameters associated with a specific type of grinding operation such as internal or external grinding. The display will request via prompts certain information to be inputted from the keyboard such as, for example, the model of the grinding machine, the workpiece and grinding wheel information, the grinding wheel diameter, the workpiece diameter and the width of both the grinding wheel and the workpiece surfaces. The in-feed rate and grinding power data is obtained and inputted from the grinding cycle scan data stored which corresponds to the chosen grinding cycle for which the computation is being made. Typical computed output information may include grinding wheel surface velocity, workpiece surface velocity, the ratio of the grinding wheel to workpiece velocity, the equivalent wheel diameter, material removal rate, the specific power consumed, the grinding forces including both tangential and normal, and the equivalent chip thickness, and other significant grinding parameters of interest in a particular application. Additional computation modules may be added to the monitoring apparatus of the present invention via keyboard input and conventional computer programming.

Apparatus for monitoring and collecting data from a plurality of transducers and for plotting in substantially real-time plots of machine member movement relative to a workpiece and the power consumed in moving the machine member has been described above in a preferred embodiment for a grinding machine. It will be understood that numerous modification and substitutions can be made without departing from the spirit and scope of the invention and that the invention may be used to monitor and collect data from any number of different type transducers used in sensing process, machine or other operational variables associated with a machine, manufacturing process or other system operation and the like. Accordingly, the present invention has been described by way of illustration rather than limitation.

I claim:

1. Apparatus for monitoring a grinding machine wherein a plurality of transducers are coupled to the machine for sensing the relative displacement between a machine member and a workpiece and for sensing the power consumed in producing the relative displacement, said apparatus comprising:

signal conditioning circuit means for receiving an electrical signal produced by an associated transducer of the plurality of transducers in response to the relative movement between the machine member and the workpiece;

means for coupling the output of said associated transducer to said signal conditioning circuit;

means for containing an instruction set, said instruction set including a plurality of operating modes to direct the operation of said apparatus in response to an input command;

signal processing means responsive to said instruction set and coupled to said signal conditioning circuit for sampling in real-time, signals produced by said associated transducers, said signal processing means further acting upon said sampled signals to produce data representative of and corresponding to each of said sampled signals;

means for storing said data, said storage means being addressable and responsive to said signal processing means for retrieving data stored at a location identified by an associated address;

visual display means coupled to said signal processing means, and means coupled to said signal processing means for receiving said retrieved data and for transforming said data for viewing in real time on said visual displays as a simultaneous plot of relative displacement between said machine member and said workpiece and the power consumption during the relative displacement substantially immediately as said data is produced;

said signal processing means comprising a central processing unit (CPU) wherein said CPU includes a computational module for determining grinding parameters from said data corresponding to said sampled signals, said computational module being selectable from a group of computational modules, and each of said computational modules including formulas for computing grinding parameters associated with a specific type of grinding process.

2. Apparatus for monitoring a grinding machine wherein a plurality of transducers are coupled to the machine for sensing the relative displacement between a machine member and a workpiece and for sensing the power consumed in producing the relative displacement, said apparatus comprising;

signal conditioning circuit means for receiving an electrical signal produced by an associated transducer included in the plurality of transducers in response to the relative movement between the machine member and the workpiece;

means for coupling the output of said associated transducer to said signal conditioning circuit;

means for containing an instruction set, said instruction set including a plurality of operating modes to direct the operation of said apparatus in response to an input command;

signal processing means responsive to said instruction set and coupled to said signal conditioning circuit for sampling in real-time, signals produced by said associated transducers, said signal processing means further acting upon said sampled signals to produce data representative of and corresponding to each of said sample signals;

means for storing said data, said storage means being addressable and responsive to said signal processing means for retrieving data stored at a location identified by an associated address;

visual display means coupled to said signal processing means;

means coupled to said signal processing means for receiving said retrieved data and for transforming said data for viewing on said visual display as a simultaneous plot of relative displacement between said machine member and said workpiece and the power consumption during the relative displacement, and said signal conditioning circuit means further including a signal receiving and calibrating circuit associated with each of the transducers being sensed, said signal receiving and calibration circuit having means for calibrating its associated transducer so that the maximum displacement corresponds to a predetermined magnitude of a first calibrating reference voltage signal and the maximum sensed power corresponds to a predetermined magnitude of a second calibrating reference voltage signal.

3. Apparatus for monitoring a grinding machine as defined in claim 2 wherein said signal receiving and calibrating circuit further includes means for adjusting the sensitivity of the apparatus so that a plot of a corresponding received signal from an associated transducer can be made to appear larger and smaller in accordance with a predetermined gain sensitivity, said sensitivity adjusting means further comprising a programmable gain circuit, said gain being selectable by and under control of said signal processing means.

4. Apparatus for monitoring a grinding machine as defined in claim 2 wherein said signal processing means comprises a central processing unit (CPU).

5. Apparatus for monitoring a grinding machine as defined in claim 4 wherein said CPU includes a computational module for determining grinding parameters from said data corresponding to said sampled signals.

6. Apparatus for monitoring a grinding machine as defined in claim 4 further including timing means for adjusting the duration of a plot.

7. Apparatus for monitoring a grinding machine as defined in claim 2 further including a keyboard for entering an input command to select one of the operating modes.

* * * * *